P. O. PEDERSEN.
GENERATOR FOR HIGH FREQUENCY CURRENTS.
APPLICATION FILED MAR. 24, 1913.
1,231,528.
Patented June 26, 1917.
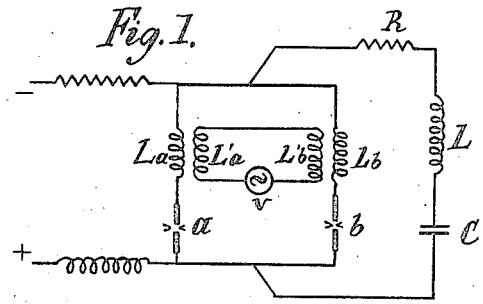
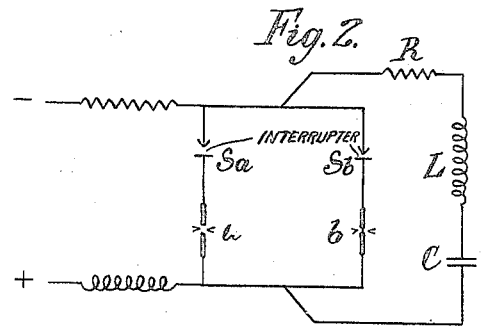
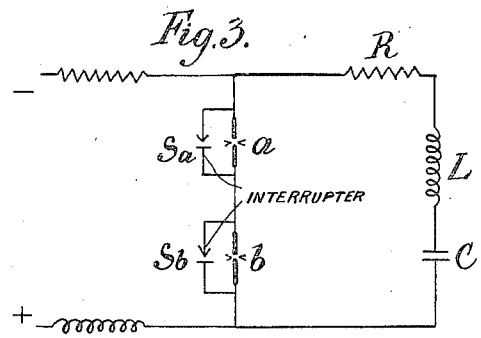
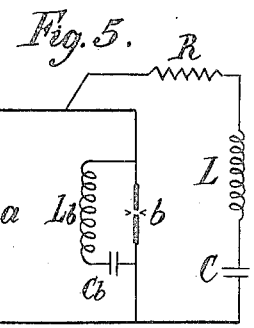
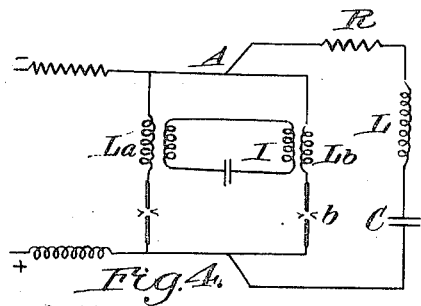
Witnesses
Waldo M. Chapin
Ida M. Patterson
Inventor
Peder Oluf Pedersen
by Rosenbaum & Stockbridge
Attys.

UNITED STATES PATENT OFFICE.

PEDER OLUF PEDERSEN, OF FREDERIKSBERG, DENMARK, ASSIGNOR TO FEDERAL TELEGRAPH COMPANY, A CORPORATION OF CALIFORNIA.

GENERATOR FOR HIGH-FREQUENCY CURRENTS.

1,231,528.  Specification of Letters Patent.  Patented June 26, 1917.

Application filed March 24, 1913. Serial No. 756,323.

*To all whom it may concern:*

Be it known that I, PEDER OLUF PEDERSEN, a subject of the King of Denmark, residing at Frederiksberg, near Copenhagen, and Kingdom of Denmark, have invented certain new and useful Improvements in Generators for High-Frequency Currents, of which the following is a full, clear, and exact description.

This invention relates to generators for high frequency currents.

It has been heretofore proposed to produce currents of high frequency by feeding direct current to an oscillatory circuit including a self-induction L, a condenser C, and an arc, the period of the alternating current being equal to $2\pi\sqrt{LC}$ in accordance with Kelvin's formula. However, when this method has been used even where the arc has been arranged in an atmosphere containing hydrogen and the anode of the arc cooled, the maximum frequency which can be obtained is limited, since it is essential that the anode be cooled to prevent the current passing through the circuit from becoming a mere direct current. It is obvious that such cooling of the anode will necessarily limit the frequency which can be obtained.

The object of my invention is to provide a generator with which frequencies, higher than those previously obtained, can be procured, and with this object in view, the invention contemplates the provision of a plurality of arcs which are so arranged that the current impulses pass successively through the arcs, as for example, where three arcs are used only each third current impulse passes through a single arc, and this arc thereafter remains extinguished for two entire periods which gives the arc a sufficiently long time for being cooled. If the shiftings of the arc are promptly timed, this will not affect the period of the alternating currents which passes through the circuit containing the induction L and the condenser C. Instead of changing the arc through which the current passes for each current impulse, it is sufficient if the arc, through which the current passes, is changed after the second, third, etc., current impulse. However in the preferred embodiment of the invention, it is preferable to shift the arc after each period. The period for shifting the arcs need not be in strict accordance with the natural period $2\pi\sqrt{LC}$ of the oscillatory circuit. The period of the alternating current is, of course, determined by the period of the shifting of the arc.

One of the important advantages of the present system is that it provides a sufficiently long time for each arc to cool and deionize, that no special methods for cooling the arc need be utilized. It is also obvious that the discharge completely loses the character of an arc since so long a time elapses between the passage of single current impulses through one of the discharge spaces and the discharges therefore become in effect a series of non-oscillating sparks. Instead of utilizing discharge spaces or arcs, vacuum tubes and the like may also be used, and in cases where the frequency is not too high, simple interrupters may also be used to advantage.

It is also to be understood that it is not necessary to change the entire discharge space through which the current impulses pass, since it will suffice if at least the cathode and a part of the discharge space is changed. In this manner, the same anode may be used for a plurality of discharge spaces.

The invention and its object will be apparent from the embodiments of the invention shown in the drawing, wherein Figures 1 to 5, inclusive, show various modifications of the circuit arrangements which may be used, but it is intended that such modifications and embodiments will be regarded as descriptive and not as limiting the invention.

An example of the use of two arcs or discharge spaces $a$ and $b$ is shown in Fig. 1. Between the cathodes and the feed conductor are inserted self inductions L$a$ and L$b$ (which as a rule have the same value), and the circuit of vibration proper is formed by the condenser C, the inductance L and the rheostat R in connection with the inductances L$a$ or L$b$. The period is the same, viz. T in both cases. The circuit of oscillation I indicated, the distribution circuit, is coupled to both of the self inductions L$a$ and L$b$, and its natural period is 2T. The manner of acting of the system is explained as follows:

If first a current impulse passes through the discharge space $a$, a free oscillation is thereby induced in the circuit I; a period later the oscillation in this circuit will through the inductance L*a* counteract, that a current impulse again passes the discharge space *a*, but at same time it will promote the passage of a current impulse through the discharge space *b*, etc. It is of importance that the damping in the circuit I is as small as possible.

A somewhat different arrangement is shown in Fig. 2. The distributing circuit is here substituted by two coils L'*a* and L'*b* coupled to the coils L*a* and L*b* respectively; through the two first named coils is passed an alternating current from a generator *v*; the period of the alternating current is 2T. The manner of acting will easily be understood; each second discharge passes through the discharge space *a*, each second through the discharge space *b*. If the period of the alternating currents is 4T, two discharges will pass through the discharge space *a*, thereafter two discharges through the discharge space *b*, and so on. Analogical methods can be used at three and more discharge spaces.

Fig. 3 again shows another arrangement. Here S*a* and S*b* designate interrupters which alternately close and interrupt the connection between the cathodes and the feed conductor. The contact period ought to be in the neighborhood of the period T of the oscillation circuit, or in the neighborhood of *n*T, where *n* is an integer. In the latter case first *n* discharges are passing through the discharge space *a*, thereafter *n* discharges through the discharge space *b*, and so on. For sake of simplicity, in the following *n* is presumed to be equal to 1. If the duration of the contact, the length of spark, the feed tension and feed current and the values of the resistance R, the inductance L and the capacity C be suitably chosen, it can be obtained that the interrupters S*a* and S*b* work completely without sparks. If at same time the sparking distances *a* and *b* are chosen in such a manner, that the potential between the electrodes during the passage of the current is small, while the ignition tension is relatively high, a very high efficiency is obtained, pretty near all the energy of the direct current being transformed into oscillations. It is a matter of course, that also at this arrangement three or more discharge spaces can be used.

Fig. 4 shows the corresponding arrangement for two discharge spaces in series. The manner of acting will easily be understood.

Fig. 5 shows a somewhat different arrangement. The ignition tensions for the discharge spaces *a* and *b* are here so high that ignition will normally not take place, and the discharge spaces *a* and *b* are shunted to circuits containing the inductance L*a*, the capacity C*a* and the inductance L*b* and the capacity C*b*, respectively. The value of the products of each inductance and the thereto belonging capacity is chosen in such a manner, that the period for the two circuits, consisting of the discharge space *a*, the inductance L*a* and the capacity C*a*, and the discharge space *b*, the inductance L*b* and the capacity C*b*, respectively, is much less than T.

The discharges are incurred by in the inductances L*a* and L*b* sudden high tensions being alternately induced which cause sparks to jump through the discharge space *a* and the discharge space *b*, respectively, and thereby starts the discharges proper. The starting sparks follow each other with an interval of about *n*T, where T as usual indicates the natural period of the oscillation circuit. Also at this arrangement the number of discharge spaces is arbitrary.

Having now particularly described and ascertained the nature of my said invention and in what manner the same is to be performed, I declare that what I claim is:—

1. A generator for high frequency currents comprising a single oscillation circuit having a plurality of discharge spaces therein, and means for directing a high frequency current through said oscillation circuit and for successively and periodically directing said current through said spaces at periods which are a simple multiple of the high frequency current passing through the oscillation circuit.

2. A generator for high frequency currents comprising a single oscillating circuit having a plurality of discharge spaces connected in parallel therein, and means for directing a high frequency current through said oscillation circuit and for successively and periodically directing said current through said spaces at periods which are a simple multiple of the high frequency current passing through the oscillation circuit.

In witness whereof, I have subscribed my signature, in the presence of two witnesses.

PEDER OLUF PEDERSEN.

Witnesses:
 VIGGO BLOM,
 VALDEMAR CHRISTENA.